United States Patent [19]
Yahnke et al.

[11] Patent Number: 5,208,121
[45] Date of Patent: May 4, 1993

[54] BATTERY UTILIZING CERAMIC MEMBRANES

[75] Inventors: Mark S. Yahnke, Madison, Wis.; Golan Shlomo, Haifa, Israel; Marc A. Anderson, Madison, Wis.

[73] Assignee: Wisconsin Alumni Research Foundation, Madison, Wis.

[21] Appl. No.: 717,789

[22] Filed: Jun. 18, 1991

[51] Int. Cl.$^5$ ............................................... H07M 6/12
[52] U.S. Cl. ..................................... 429/162; 429/247
[58] Field of Search ................................. 429/162, 247

[56] References Cited

U.S. PATENT DOCUMENTS

| | | |
|---|---|---|
| 3,042,732 | 7/1962 | Kordesch . |
| 3,178,314 | 4/1965 | Horn et al. ......................... 429/162 X |
| 3,379,570 | 4/1968 | Berger et al. ....................... 429/247 X |
| 3,446,669 | 5/1969 | Arrance et al. ....................... 429/247 |
| 3,539,394 | 11/1970 | Arrance ........................... 429/247 X |
| 4,034,144 | 7/1977 | Chireau ........................... 429/247 X |
| 5,006,248 | 4/1991 | Anderson et al. ............. 210/500.25 |

OTHER PUBLICATIONS

Kordesch, "Primary Batteries—Alkaline Manganese Dioxide—Zinc Batteries," Comprehensive Treatise on Electrochemistry vol. 3, pp. 219–232 (1981).

*Primary Examiner*—Stephen Kalafut
*Attorney, Agent, or Firm*—Quarles & Brady

[57] ABSTRACT

A thin film battery is disclosed based on the use of ceramic membrane technology. The battery includes a pair of conductive collectors on which the materials for the anode and the cathode may be spin coated. The separator is formed of a porous metal oxide ceramic membrane impregnated with electrolyte so that electrical separation is maintained while ion mobility is also maintained. The entire battery can be made less than 10 microns thick while generating a potential in the 1 volt range.

8 Claims, 1 Drawing Sheet

BATTERY UTILIZING CERAMIC MEMBRANES

FIELD OF THE INVENTION

The present invention relates to electrochemical power sources in general and relates, in particular, to very thin alkaline dry cell batteries formulated using ceramic membranes.

BACKGROUND OF THE INVENTION

An alkaline dry cell battery is a storage device for electrical power intended to provide electrical power on demand to an electrically powered device. A dry cell battery is so called because its electrolyte is in the form of a moist paste, which is therefore not capable of being spilled, since it is in a semi-solid state. The typical commercially available dry cell batteries manufactured today are constructed as a cylinder. The cathode is typically a manganese dioxide ($MnO_2$) powder cathode, with additives, formed on the outside of the cylinder of the battery. The cathode layer is typically coated onto the interior of a nickel plated steel can. The anode, formed of powdered zinc mixed with electrolyte, is located centrally in the cylinder of the battery. The centrally located cathode surrounded by an alkaline paste containing an electrolyte base, such as potassium hydroxide (KOH). Such alkaline dry cells are not rechargeable due to the irreversible disintegration of the cathode caused by its expansion as electrical power flows from the battery.

The present invention makes use of the technology of ceramic membranes. Ceramic membranes are compositions of matter which consist of a plurality of metal oxide particles which are partially fused together to form a material which is solid, rigid, stable, but which is also porous. The porosity of the ceramic membrane can be controlled by manipulation of process conditions during its fabrication so as to create pores in any desirable range of pore sizes. Such membranes can also be made over a wide range of densities. Typically, porous metal oxide ceramic membranes are made by sol-gel processes. In such processes first metal particles are formed by a sort of inorganic polymerization/condensation from molecular precursors in a solution or suspension. The particles are maintained as partially soluble metal oxide particles in suspension by techniques such as peptization, aggressive agitation, or other similar means to prevent aggregation and resultant precipitation of larger metal oxide particles. Such a metal oxide suspension, known as a sol, then has the solvent, either water or alcohol, removed from it to create a gelified, semi-solid material referred to as a gel. The gel then has further solvent removed and then by heating or firing the gel, the particles which make up the gel are fused together to form a continuous metal oxide ceramic porous membrane material. One class of metal oxide porous ceramic membranes are disclosed in U.S. Pat. No. 5,006,248, which describes such materials with a uniquely small size range of pores therein.

SUMMARY OF THE INVENTION

The present invention is summarized in that a planar dry cell battery is constructed utilizing a porous metal oxide ceramic membrane separator material, so as to create a battery which is planar and which is formed of extraordinarily thin films of material.

It is an object of the present invention to provide an alkaline dry cell battery utilizing a porous ceramic membrane material which is exceedingly thin yet, has significant power production, and which thus offers the potential for being stacked in compact assemblies to create high voltage batteries.

It is yet another object of the present invention to provide an extremely thin film battery which can be readily and efficiently manufactured.

Yet another object of the present invention is to enable the production of thin film batteries which could be manufactured in a variety of specialized geometries, to potentially produce self-powered devices.

Other objects, advantages, and features of the present invention will become apparent from the following specification when taken in conjunction with the accompanying drawing figure.

BRIEF DESCRIPTION OF THE DRAWING FIGURE

The drawing figure is a cross-sectional view of the layers of an alkaline dry cell battery constructed in accordance with the present invention.

DETAILED DESCRIPTION OF THE INVENTION

Figure 1:
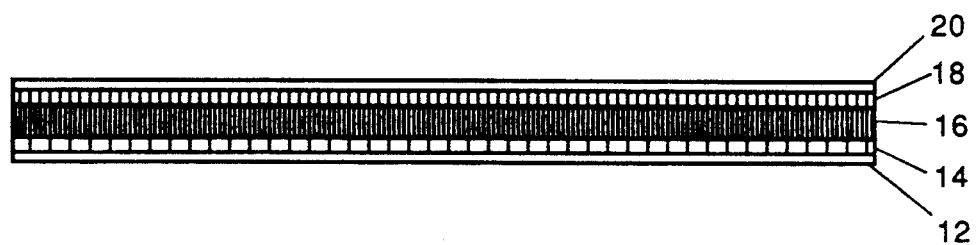

The battery of the present invention is constructed so as to be extraordinarily thin. As in most batteries, the battery of the present invention requires a cathode, an anode, and a separator for the battery. Because of the advantages achieved by the use of ceramic membrane technology for the construction of these layers, the individual layers, and the combination of the layers which make up the battery, can all be fabricated in thin films while maintaining the electrical separation and the needed surface area to achieve significant electrical power. The present invention is illustratively described as an alkaline dry cell type battery but it is intended that other classes of battery may also use this technology.

The alkaline manganese dioxide zinc dry cell battery is based on zinc metal anode, a manganese dioxide cathode, and a separator which contains an absorbed electrolyte capable of charge transfer between the anode and the cathode. It is this general approach that is utilized in the illustrative battery described here.

The advantages of a thin cathode for such a battery have previously been described by Kordesch in "Primary Batteries—Alkaline Manganese Dioxide-Zinc Batteries" in *Comprehensive Treatise on Electrochemistry*. Kordesch reports that manganese dioxide electrodes 0.6 mm thick were shown to perform significantly better than the typically used cylindrical electrodes which were 3 mm thick. The reason for this is the more efficient transport of the reactants (e.g. $H_2O$ or $H+$) to the surface of the individual $MnO_2$ particles. Also, he showed that rechargeability becomes more efficient in thinner cathodes. In the battery described herein, the cathode can be made even thinner, by depositing a combination mixture of manganese dioxide and graphite particles onto a support consisting of an inert conductive metal foil. The metal foil serves as a current collector for the cathode. The use of a mixture of manganese dioxide and graphite particles allows for improved conductivity within the cathode itself. Deposition of the manganese dioxide and graphite particles on the current collector can be achieved by spin-coating of the metal surface with a sol-gel derived manganese dioxide suspension containing a range of graphite between 7 and 20%, preferably around 15%. Using such a spin-coating technique from a sol gel derived suspension, it is possible to obtain a cathode layer which is on the order of 1 micron thick, coated onto a conductive metal foil backing. The cathode does not have to be porous, but does advantageously have a high surface area.

One problem which can occur in rechargeable batteries is the slow disintegration of the cathode during cell cycling. This occurs, in part, because the cathode expands during discharge. Hence the cathode must be well supported in order to have reliable battery design. This cathode design makes use of a ceramic material coated onto a metal substrate, thereby making the cathode very thin and also adjacent to the flexible separator. Yet because of the manner of deposition of the cathode material onto the support, a high surface contact area between the cathode and the electrolyte is maintained.

The battery separator in a battery prevents contact between the cathode and anode, and thus is essential to the performance of the cell in maintaining an electrochemical potential. The battery separator has two principal functions. First it must absorb within it the electrolyte, typically an electrolytic salt, such as the potassium hydroxide used here. Secondly the separator must prevent any penetration of the zinc away from the anode. In the battery of the present invention, an aluminium oxide (gamma-AlOOH) porous ceramic membrane is used as the battery separator. This material achieves both objectives, acting as a good battery separator while also introducing into the battery the advantage of a very thin separator layer. Such an alumina metal oxide ceramic separator layer is porous and is a good insulator. In addition, the pore size range can be selected so as to be relatively impermeable to penetration of larger zinc particles. Such a membrane can be prepared by spin coating on a finished cathode assembly with a layer of a colloidal alumina (gamma-AlOOH) suspension. By spin coating such a cathode from a colloidal suspension, it is possible to make a porous ceramic aluminium oxide membrane of selectable porosity, and of any desired thickness between 1 and 10 microns, or thicker. Such membranes may be fired up to temperatures of 500° Centigrade, while retaining significant porosity. By manipulating the production of the colloidal sol, the size of the pores in the membrane can also be controlled. The porous separators may then be impregnated with an electrolyte or salt solution.

The anode of the thin film battery may be another thin layer, this time formed from a mixture mainly of colloidal zinc. The anode may be deposited via spin coating from a zinc sol on a cathode-separator assembly in a manner similar to preparation of the other layers. Alternatively, a ceramic $ZnO_2$ membrane can be reduced to create a zinc metal membrane with a large surface area. If the battery is desired to be rechargeable, the anode may also contain a structure such as copper or lead powder onto which the zinc can be plated during recharging.

The thin film battery of the present invention can be constructed by building up the appropriate layers from one conductor to the other in either order. As described below, the thin film battery is built up by successive deposition of layers from the cathode conductor to the anode conductor. The process can be begun at either of the two current collector or conductive surfaces.

A schematic of the layers of the thin film battery is shown in the drawing FIG. 1. Illustrated in FIG. 1, which is not sealed, is the order of the various layers of the thin film battery. The cathode collector layer, a metal foil current collecting surface, is designated at 12. The cathode itself, consisting of a manganese dioxide derived layer, mixed with graphite, is illustrated at 14, and is on the order of 1 micron in thickness. Designated at 16 is the aluminium oxide separator layer. The zinc anode is indicated at 18, and is approximately equal in thickness to the cathode. The anode current collector is indicated at 20, and is again a thin metal foil conductive sheet. In other embodiments, the anode current conductor 20 may be omitted and electrical contact made directly to the zinc metal anode. The overall size of the battery cell, in total, can be as little as five to ten microns in total thickness.

The advantage of this thin film design for a battery over a conventional manganese dioxide/zinc battery is that there is a very large interface to volume ratio. This should, in theory, increase the potential power surge capability of the battery since, there is a greater surface contact between the electrodes and the electrolyte. This feature reduces mass transfer limitations that might otherwise be present in other geometries. It has previously been proposed that the limiting step in the reduction of manganese dioxide and an alkaline dry cell is the need for molecular diffusion of protons into the crystals of the cathode layer. This design which uses a very thin cathode layer, composed of very small particles, can theoretically increase the performance of a battery, by eliminating or decreasing this factor. In addition, the thin film battery is of a strikingly small thickness compared to prior art battery designs, and therefore may achieve a higher potential drop per unit length than previous designs would allow. For example, since battery cells of this design can generate an electrical potential of 1.4 volts with a total thickness of about 5 microns, if a series of similar batteries could be hooked together in series, and assuming that the aluminium oxide separator can effectively limit current leakage, a total voltage of 2800 volts could be 1 centimeter thick.

EXAMPLE

Two batteries of the design of FIG. 1 were constructed beginning with a cathode collector plates of titanium. Two thin titanium plates approximately 20×20×0.5 mm were utilized as the substrate. An aqueous suspension containing 30 grams per liter of commercially available electrolytic manganese dioxide particles was obtained (Aldrich Chemical). The size of the particles in the commercially available suspension was not known. The suspension was then applied to the titanium plates using a spin coating apparatus (Headway Research PWM101D Spinner, R790 bowl) at 2000 rpm for 30 seconds or until visibly dry. Four successive coats of the manganese dioxide suspension were spun-coated onto the metal surfaces this way. Between each coating, the plates were fired at 400° C. for 30 minutes, to fire the layers of the cathode coating in place.

Next the battery separators were created for the two batteries. An aqueous gamma-alumina (AlOOH) sol was prepared. The alumina sol contained 60 grams per liter of alumina particles. The sol was spun onto the finished cathode assemblies at 750 rpm for 90 seconds. The coated cathode assemblies were fired at 500° C. for 1 hour. The resulting cathode and support assemblies were then soaked in 6M KOH over night to impregnate the membrane with the potassium hydroxide electrolyte.

To verify that the cells were capable of generating electricity, a single unified zinc foil material was used as both the anode and the anode collector. Thin pieces of zinc foil, of approximately 10×10×0.1 mm, were cut and positioned directly onto the alumina membranes, in the manner illustrated in FIG. 1. Each entire assembly was then, in turn, sandwiched tightly between the two insulated ends of a C-clamp to ensure intimate contact between all components, particularly the zinc foil and the separator. The potential drop between the two electrodes was then measured with a digital multi-meter. Both batteries demonstrated high, although slightly varying open circuit voltages. One of the batteries measured 0.91 volts and the other measured 1.4 volts. The thickness of the batteries thus created was calculated to be between 1 and 5 microns.

Thus these test batteries, utilizing a planar zinc anode rather than a configuration with a higher surface area, demonstrated the feasibility of this approach to battery design. It is anticipated that by utilizing a spin coated zinc layer, having a higher surface area, that more efficient power generation will be achieved.

It is to be understood that the present invention is not limited to the particular embodiments described above, but embraces all such modified forms thereof as come within the scope of the following claims.

We claim:

1. A thin film battery cell comprising
a cathode collector of conductive metal material;
a cathode surface deposited on the cathode collector;
a separator formed of a metal oxide porous ceramic membrane impregnated with an electrolyte; and
an anode formed of a metallic conductive metal;
wherein the cell is less than 10 microns in total thickness.

2. A thin film battery cell comprising
a cathode collector of conductive metal material;
a cathode surface deposited on the cathode collector;
a separator formed of a gamma-alumina porous ceramic membrane impregnated with an electrolyte; and
an anode formed of a metallic conductive metal.

3. A thin film battery cell as claimed in claim 2 wherein alumina membrane is less than 5 microns thick.

4. A thin film battery cell as claimed in claim 1 wherein the electrolyte is aqueous potassium hydroxide.

5. A thin film battery cell as claimed in claim 1 wherein the cathode surface is a spin coated surface of particles of manganese dioxide.

6. A thin film battery cell as claimed in claim 4 wherein manganese dioxide surface is mixed with graphite.

7. A thin film battery cell as claimed in claim 1 wherein the anode is a spin coated surface of zinc powder formed onto a metal film collector.

8. A thin film battery comprising
a cathode collector of conductive metal foil;
a cathode surface of spin coated manganese dioxide particles deposited on the cathode collector foil, the manganese dioxide being mixed with graphite, the thickness of the cathode surface being less than 3 micron;
a separator formed of an alumina oxide porous ceramic membrane fired at a temperature of up to 500° C. and impregnated with an electrolyte;
an anode collector of conductive metal foil; and
an anode surface of zinc particles deposited on the anode collector.

* * * * *

UNITED STATES PATENT AND TRADEMARK OFFICE
CERTIFICATE OF CORRECTION

PATENT NO. : 5,208,121
DATED : May 4, 1993
INVENTOR(S) : Mark S. Yahnke, Golan Shlomo, Marc A. Anderson It is certified that error appears in the above-identified patent and that said Letters Patent is hereby corrected as shown below:

In column 1, after the title, the following text should be inserted:

--STATEMENT REGARDING FEDERALLY SPONSORED RESEARCH

This invention was made with United States Government support awarded by the Department of Energy (DOE), Grant No. DE-AS07-86ID12626. The United States Government has certain rights in this invention. --

Signed and Sealed this

Twenty-first Day of June, 1994

*Attest:*

BRUCE LEHMAN

*Attesting Officer*   *Commissioner of Patents and Trademarks*